(12) United States Patent
Kisailus et al.

(10) Patent No.: US 10,010,933 B2
(45) Date of Patent: Jul. 3, 2018

(54) MAGNETICALLY CONTROLLED CASTING PROCESS FOR MULTISTRUCTURAL MATERIALS

(71) Applicant: The Regents of the University of California, Oakland, CA (US)

(72) Inventors: David Kisailus, Riverside, CA (US); James Weaver, Riverside, CA (US); Garrett Milliron, Riverside, CA (US)

(73) Assignee: The Regents of the University of California, Oakland, CA (US)

( * ) Notice: Subject to any disclaimer, the term of this patent is extended or adjusted under 35 U.S.C. 154(b) by 712 days.

(21) Appl. No.: 13/767,699

(22) Filed: Feb. 14, 2013

(65) Prior Publication Data

US 2016/0151939 A1 Jun. 2, 2016

Related U.S. Application Data

(60) Provisional application No. 61/599,627, filed on Feb. 16, 2012.

(51) Int. Cl.
| | |
|---|---|
| *B22D 27/02* | (2006.01) |
| *B22C 9/22* | (2006.01) |
| *B29C 33/38* | (2006.01) |
| *B29C 39/00* | (2006.01) |

(52) U.S. Cl.
CPC .............. *B22D 27/02* (2013.01); *B22C 9/22* (2013.01); *B29C 33/3857* (2013.01); *B29C 39/006* (2013.01); *B29K 2995/0008* (2013.01)

(58) Field of Classification Search
CPC .......... B22D 27/02; B22D 23/00; B22C 9/22; B29C 33/38
USPC ........................ 164/498, 500, 147.1; 264/405
See application file for complete search history.

(56) References Cited

U.S. PATENT DOCUMENTS

| | | | | |
|---|---|---|---|---|
| 3,546,348 A | * | 12/1970 | Decorso | C22B 4/00 266/208 |
| 3,781,158 A | * | 12/1973 | Leghorn | B21B 23/00 164/459 |
| 5,786,040 A | * | 7/1998 | Leddy et al. | B03C 1/01 204/290.11 |
| 8,861,064 B2 | * | 10/2014 | Lamprecht et al. | B29C 33/38 359/290 |
| 2012/0225252 A1 | * | 9/2012 | Lamprecht et al. | B29C 33/38 428/156 |
| 2012/0280430 A1 | * | 11/2012 | Jones | B29C 35/0272 264/400 |

FOREIGN PATENT DOCUMENTS

| | | | | | |
|---|---|---|---|---|---|
| JP | | 54-50403 A | * | 4/1979 | .............. C22C 1/10 |
| WO | WO 2011/055347 A2 | * | 5/2011 | ............. G02B 26/02 |

* cited by examiner

*Primary Examiner* — Kevin P Kerns
(74) *Attorney, Agent, or Firm* — Gavrilovich, Dodd & Lindsey LLP

(57) ABSTRACT

The disclosure provides a method to produce solid materials displaying structural ordering which can be controlled through a wide range of sizes and shapes. The process involves casting a medium, which solidifies (such as a resin or molten metal) over the surface of a magnet-fluid.

19 Claims, 2 Drawing Sheets

MAGNETICALLY CONTROLLED CASTING PROCESS FOR MULTISTRUCTURAL MATERIALS

CROSS REFERENCE TO RELATED APPLICATIONS

This application claims priority under 35 U.S.C. § 119 from Provisional Application Ser. No. 61/599,627, filed Feb. 16, 2012, the disclosure of which is incorporated herein by reference.

TECHNICAL FIELD

The disclosure provides solid materials displaying structural ordering which can be controlled through a wide range of sizes and shapes.

BACKGROUND

Producing features in a solid material using common rapid prototyping or lithographic techniques currently require the use of highly specialized and expensive equipment that must be programmed beforehand to produce the desired result. Moreover, these techniques suffer from severe limitations on feature resolution due to the large equipment costs to produce features with high resolution.

SUMMARY

The disclosure provides a method to produce solid materials displaying structural ordering which can be controlled through a wide range of sizes and/or shapes. The process comprises casting a liquid material, which solidifies (such as a resin or molten metal) over the surface of a magnetic-fluid. By placing the magnetic fluid inside a magnetic field, a long-range structural ordering can be achieved and altered in a predictable and controllable manner. This ordered structure can act as a template to produce various high aspect ratio structures via pouring a casting material around the magnetic fluid, curing the liquid (e.g., epoxy) and extracting the template (i.e., magnetic fluid) by removing the magnetic field. The range of patterns generated includes, but are not limited to, honeycombs, grids, labyrinths, spikes, ridges, and concentric rings. In comparison to other casting methods, the processes and systems disclosed herein have cost advantages, higher scalability, higher degree of possible patterns and features, and the relative ease of quickly producing patterned and casted materials. The multi-structured materials resulting from the processes and systems disclosed herein can be used "as-is" or as molds for casting additional materials.

In a particular embodiment, the disclosure provides a process for making a multi-structured material, comprising the steps of: providing a magnetic-fluid; exposing the magnetic-fluid to a magnetic field to obtain a magnetic-fluid template; providing a casting medium; and generating a cast of the magnetic-fluid template so as to produce a multi-structured material.

In a further embodiment, a process disclosed herein utilizes a magnetic-fluid comprised of a plurality of magnetic materials or particles dispersed in one or more carrier fluids containing one or more surfactants. Examples of magnetic materials or particles, include ferromagnetic oxides; manganese ferrites; cobalt ferrites; barium ferrites; metallic composite ferrites comprising zinc, nickel and mixtures thereof; iron; cobalt; rare earth metals; and mixtures of any of the foregoing. In a particular embodiment, a magnetic-fluid used in a process disclosed herein is a ferrofluid comprising nanometer sized magnetic particles. In an alternate embodiment, a magnetic-fluid used in a process disclosed herein is a magnetorheological fluid comprising micron sized magnetic particles.

In a certain embodiment, a process disclosed herein utilizes a magnetic field generated using a single or an array of magnetic devices and/or magnetic materials. In a further embodiment, a process disclosed herein utilizes a magnetic field generated from one or more permanent magnets, such as those comprised of alloys of neodymium/iron/boron, Samarium cobalt, AlNiCo, or ferrite. In yet a further embodiment, a process disclosed herein utilizes a magnetic field generated from one or more electromagnets or flattened solenoids where the current to the electromagnet or flattened solenoid can be adjustably controlled by a user entering commands into an attached computer.

In a particular embodiment, a process disclosed herein utilizes a casting medium. Examples of casting medium include, but are not limited to, molten metals, hydrogels, epoxies, resins, polysulfide rubbers, silicone rubbers, urethane rubbers, urethane plastics, urethane foams, plasters, and silicone foams. In another embodiment, a process disclosed herein utilizes a casting medium comprised of monomers that can be polymerized to a polymer. In a further embodiment, a cast comprised of the casting medium is generated by polymerizing the monomers using a curing agent. In yet a further embodiment, the curing agent can be activated by light, heat or chemical catalyst.

In a certain embodiment, a process disclosed herein further comprises removing a multi-structured material from a magnetic fluid. In a further embodiment, a multi-structured material disclosed herein can be used as a mold.

In a particular embodiment, a process disclosed herein produces a multi-structured material that is biocompatible. In another embodiment, a process disclosed herein produces a multi-structured material that is conductive. In yet another embodiment, a process disclosed herein produces a multi-structured material that can be used as a microfluidic device. In a further embodiment, a process disclosed herein produces a multi-structured material that can comprise an energy storage device.

In a certain embodiment, the disclosure provides for a casting or templating device to produce a multi-structured material, comprising a container capable of holding a magnetic fluid; a magnetic fluid; a magnetic field generator; and a casting medium.

The details of one or more embodiments of the invention are set forth in the accompanying drawings and the description below. Other features, objects, and advantages of the invention will be apparent from the description and drawings, and from the claims.

DETAILED DESCRIPTION

As used herein and in the appended claims, the singular forms "a," "and," and "the" include plural referents unless the context clearly dictates otherwise. Thus, for example, reference to "a ferrofluid" includes a plurality of such ferrofluids and reference to "the mold" includes reference to one or more molds and equivalents thereof known to those skilled in the art, and so forth.

Also, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

Unless defined otherwise, all technical and scientific terms used herein have the same meaning as commonly understood to one of ordinary skill in the art to which this disclosure belongs. Although any methods and reagents similar or equivalent to those described herein can be used in the practice of the disclosed methods and compositions, the exemplary methods and materials are now described.

All publications mentioned herein are incorporated herein by reference in full for the purpose of describing and disclosing the methodologies, which are described in the publications, which might be used in connection with the description herein. The publications discussed above and throughout the text are provided solely for their disclosure prior to the filing date of the present application. Nothing herein is to be construed as an admission that the inventors are not entitled to antedate such disclosure by virtue of prior disclosure.

The disclosure provides compositions useful for various devices. The disclosure further provides processes and devices useful for manufacturing micro- or nanostructures that have a defined structural geometry or organization. For example, the compositions of the disclosure can be used in or for the production of ornamental devices, microfluidic devices, as implants, as cell culture matrices, as drug delivery devices, as energy storage devices, as structural supports (e.g., as a portion of a face shield, glass shield, barrier or the like), as part of a bioreactor, enzyme reactor or the like, as a circuit and numerous other devices, processes and manufactures. In a certain embodiment, the multi-structure material of the disclosure comprises an increased surface area and is particularly useful where an increased surface area (particularly designable surface areas) is desirable or even required.

Figure 1:
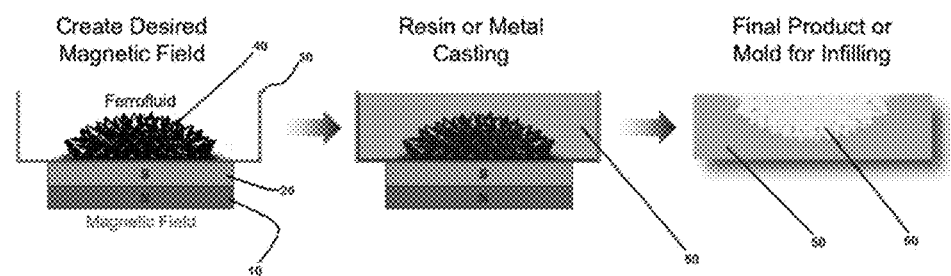
FIG. 1 shows a process of the disclosure for producing a multi-structure material.

Referring to FIG. 1, a process and system of the disclosure is depicted. Shown are magnetic field generator (e.g., a magnetic material or magnetic device) 10, optional spacer 20, container 30, and magnetic-fluid (e.g., a ferromagnetic fluid) 40. The magnetic field generator 10 causes a change in the magnetic-fluid 40 to provide a desirable feature for mold generation. The magnetic field generator can be any magnet or other device that generates a useful magnetic field of sufficient strength to cause a magnetic-fluid to take on a particular structure or design. A useful magnetic field comprises a gradient of sufficient strength to influence the shape or design of a magnetic-fluid.

As used herein, a "magnetic-fluid" refers to fluid that can be influenced by a magnetic field. Generally, a "magnetic fluid" disclosed herein is a liquid which comprises a plurality of ferromagnetic, paramagnetic, or superparamagnetic materials, or combinations thereof. A "magnetic-fluid" as used herein, would therefore include ferrofluids, magnetorheological fluids, and fluids comprising superparamagnetic particles. In a particular embodiment, the disclosure provides a process, device, or system comprising a magnetic fluid that is a ferrofluid.

As used herein, a "magnetic material" refers to material that is ferromagnetic, paramagnetic, or superparamagnetic.

As used herein, a "magnetic particle" refers to a ferromagnetic, paramagnetic, or superparamagnetic particle.

As used herein, a "magnetic field generator" refers to device(s) (e.g., electromagnets, magnetic arrays, or flattened solenoids) or material(s) (e.g., permanent or temporary magnets) capable of generating a magnetic field. A magnetic field generated by a "magnetic field generator" disclosed herein, may be a magnetic field which is generated temporally or persistent, or a combination thereof when multiple magnetic field generators are used, such as permanent magnets used in combination with temporary magnets, or permanent magnets used in combination with electromagnets. A "magnetic field generator" as used herein may be an integral part of a process and system of the disclosure, or alternatively be a separate component to be used with a process and system of the disclosure.

As used herein, a "magnetic fluid template" refers to magnetic-fluid that under the influence of a magnetic field has formed a regular pattern on the surface of the magnetic-fluid, such as peaks and valleys, which persist until the magnetic field is removed.

In a particular embodiment, the disclosure provides a process and system, which comprises a magnetic field generator 10. In a further embodiment, a magnetic field generator 10 disclosed herein is comprised of one or more permanently or temporary magnetic materials that can generate a magnetic gradient. In another embodiment, a magnetic field generator 10 disclosed herein is comprised of permanently magnetized material, such as a permanent magnet. In yet another embodiment, a magnetic field generator 10 disclosed herein is comprised of one or more permanent magnets. In a further embodiment, a magnetic field generator 10 disclosed herein is comprised of one or more permanent magnets that are constructed from commercially available magnetic alloys, such as alloys of neodymium/iron/boron, Samarium cobalt, AlNiCo, and sintered iron oxide and barium or strontium carbonate (ceramic or ferrite). In an alternate embodiment, a magnetic field generator 10 disclosed herein is comprised of one or more permanent "off-the-shelf" magnets, which can be purchased commercially, such as those available from Apex Magnets (Petersburg, W. Va. 26847 USA).

In a certain embodiment, a magnetic field generator 10 disclosed herein is comprised of a material or device, which produces a temporary magnetic field, such as an electromagnet. In a further embodiment, a magnetic field generator 10 disclosed herein is comprised of one or more electromagnets. The electromagnets of the disclosure are made by winding a wire into multiple loops around a core material to form a solenoid. To magnetize the electromagnets, an electrical current is passed through the solenoid to create a magnetic field. The field is strongest on the inside of the coil, and the strength of the field is proportionate to the number of loops and the strength of the current. The material at the center of the coil, the core of the solenoid, can also affect the strength of an electromagnet. If a wire is wrapped around a nonmagnetic material, the overall magnetic field will not be very strong. However, if the core is composed of ferromagnetic material, such as iron, the strength of the magnet will dramatically increase. In a particular embodiment, the disclosure provides for a magnetic field generator 10 comprised of one or more electromagnets that have solenoids of certain field strength B, whereby B of the solenoids can be adjusted by increasing or decreasing the number of turns per unit length of a wire to form a tighter denser coil, using a magnetic or nonmagnetic core, by increasing or decreasing the length of coiled wire, and/or by adjusting the current delivered to the solenoid.

In yet another embodiment, a magnetic field generator 10 disclosed herein is comprised of one or more temporary magnets used in combination with one or more permanent magnets and/or electromagnets of the disclosure. The temporary magnets of the disclosure can vary in composition, but have the similar property of behaving like a permanent magnet when in the presence of a magnetic field.

In a particular embodiment, a magnetic field generator 10 disclosed herein is designed so that the generated magnetic field is directional, of a certain magnitude and/or of certain field strength. Permanent magnets field strength, direction and magnitude can be adjusted by the choice of the magnetic material, geometry, configuration, and initial magnetization. Electromagnets and flattened solenoids field strength, direction and magnitude can be adjusted by choice of composition of the solenoids, turn density of the coiled wire, length of the coiled wire, and/or current provided to the solenoid.

In a particular embodiment, the direction, magnitude and/or field strength of a magnetic field generator 10 disclosed herein can be controlled by physically moving and/or turning the magnetic field generator 10 in a directional manner in respect to a magnetic-fluid 40 disclosed herein. For example, a magnetic field generator 10 can be moved on the Z-axis away from or nearer to the magnetic-fluid 40. In yet a further embodiment, a magnetic field generator 10 disclosed herein can be moved on the X, Y and/or Z axes in relation to the magnetic-fluid 40. In another embodiment, the strength of a magnetic field generated by magnetic field generator 10 disclosed herein can be adjustably controlled by a user entering commands into an attached computer. For example, the field strength of a magnetic field generator 10 comprising one or more devices, such as electromagnetics, flattened solenoids, or magnetic arrays, can be adjusted by varying the levels of current provided to the devices, which can be controlled by a user entering commands into an attached computer. Alternatively, a magnetic field generator 10 can be physically moved to adjust the field strength provided to a magnetic fluid. For example, a magnetic field generator 10 can be actuated by use of motors or the like, which operation can be controlled by a user entering commands into an attached computer.

In a certain embodiment, a magnetic field generator 10 disclosed herein can produce a magnetic field having a predefined shape or pattern so that when magnetic-fluid 40 is placed near the magnetic field, magnetic-fluid 40 assumes a shape or pattern that corresponds to the patterned magnetic field. A magnetic field can be defined to have a predefined shape or pattern by using methods known in the art, including by use of magnetic material(s) that are shaped or patterned.

In a particular embodiment, the magnetic field generator 10 disclosed herein can either be an integral part of a process and system of the disclosure, or alternatively be a separate component to be used with a process and system of the disclosure.

In a certain embodiment, the disclosure provides a process and system which comprises spacer 20. In an alternate embodiment, a process and system disclosed herein does not comprise spacer 20. Spacer 20 can be made of any material which can be used to modify the strength, pattern or production of a magnetic field. In a particular embodiment, spacer 20 is provided so as to modify the magnetic field, distance, or pattern of a magnetic field generated from a magnetic field generator 10. In another embodiment, spacer 20 is comprised of one or more materials that allow for the transmission, or partial transmission of a magnetic field generated from the magnetic generator 10. In another embodiment, spacer 20 is comprised of a composite of materials that allow for the selective transmission of a magnetic field generated from a magnetic generator 10 by allowing transmission of magnetic field in one or more transition portions of spacer 20, while blocking transmission of magnetic field in one or more blocking portions of spacer 20. Magnetic fields can be blocked by any manner known in the art including the use of materials that have a high magnetic permeability, such as mu-metals. In a further embodiment, spacer 20 can further comprise one or more temporary magnetic materials arranged in a pattern or design so that magnetic-fluid 40 assumes a corresponding design or pattern when a magnetic field is generated from a magnetic field generator 10 and applied through the temporary magnetic materials of spacer 20.

In a certain embodiment, the disclosure provides a process and system, which comprises container 30. Container 30 can be of any geometry and dimension as long it can contain magnetic-fluid 40. Container 30 may be in a desired shape for a particular molding or casting process. Container 30 can be comprised of a variety materials including, but not limited to, plastic, glass, non-absorbent paper, wood or the like. In a particular embodiment, container 30 has a substantially flat bottom surface. In another embodiment, container 30 has a largely convex bottom surface. In yet another embodiment, container 30 has a largely concave bottom surface. In a certain embodiment, one or more portions of the bottom surface of container 30 is raised and/or recessed so as to form a particular design. In such an instance, magnetic-fluid 40 can preferably flow into and/or settle in one or more recessed bottom surface portions of container 30. In a further instance, magnetic fluid 40 may not fully or only partially cover one or more raised bottom surface portions of container 30.

In a certain embodiment, the disclosure provides a process and system which comprises one or more magnetic-fluids 40. For purposes of this disclosure, magnetic-fluids 40 can be comprised of ferromagnetic materials, paramagnetic materials, superparamagnetic materials, or any other materials or compositions that can be manipulated by a magnetic field. Generally, the magnetic-fluids 40 disclosed herein are stable and can be stored for months to years at a time without the ferromagnetic, paramagnetic, and/or superparamagnetic materials aggregating and forming precipitates. In a particular embodiment, magnetic-fluid 40 is comprised of ferromagnetic particles.

Paramagnetic materials are characterized by containing unpaired electrons which are not coupled to each other through an organized matrix. They have only a weak magnetic susceptibility and when the field is removed quickly lose their weak magnetism. A paramagnetic particle can be comprised of, for example, iron dispersed in a polymer, and can be obtained, for example, from Miltenyi Biotec (Bergisch Gladbach, Germany or Immunicon (Huntingdon Valley, Pa.). In a certain embodiment, magnetic-fluid 40 is comprised of paramagnetic particles.

Superparamagnetism occurs in ferromagnetic materials when the crystal diameter is decreased to less than a critical value. Superparamagnetic materials have highly magnetic susceptibilities, e.g., they become strongly magnetic when placed in a magnetic field, but, like paramagnetic materials, rapidly lose their magnetism. Whereas paramagnetic particles exhibit some resonance and hysteresis, and therefore can clump together after exposure to a magnetic field ceases, superparamagnetic particles completely demagnetize when the field is removed, thus allowing the superparamagnetic particles to be redispersed without clumping after removal of the magnetic field. In a particular embodiment, magnetic-fluid 40 is comprised of superparamagnetic materials.

Although the above-mentioned definitions are used for convenience, there is a continuum of properties between paramagnetic, superparamagnetic, and ferromagnetic materials depending on crystal size and composition. Thus, these terms are used only for convenience, and "superparamagnetic" is intended to include a range of magnetic properties between the two designated extremes. In a particular embodiment, a magnetic-fluid 40 disclosed herein is comprised of nanoscale sized magnetic materials having diameters selected from 1 to 100 nanometers, 1 to 50 nanometers, 1 to 25 nanometers, 1 to 10 nanometers, or less than 10 nanometers. In another embodiment, a magnetic-fluid 40 disclosed herein is comprised of micron sized magnetic materials having diameters selected from 1 to 100 microns, 1 to 50 microns, 1 to 25 microns, 1 to 10 microns, or less than 10 microns. In yet another embodiment, a magnetic-fluid 40 disclosed herein is comprised of Angstrom sized magnetic materials having diameters selected from 1 to 100 Angstroms, 1 to 50 Angstroms, 1 to 25 Angstroms, 1 to 10 Angstroms, or less than 10 Angstroms.

In a particular embodiment, one or more magnetic-fluids 40 disclosed herein are comprised of magnetic particles. Examples of magnetic particles that can comprise one or more magnetic-fluids 40 disclosed herein include those presented in U.S. Pat. No. 4,946,613, which is incorporated herein by reference in its entirety. Exemplary magnet particles/materials that comprise one or more magnetic-fluids 40 disclosed herein, include: (i) ferromagnetic oxides such as manganese ferrites other than magnetite, cobalt ferrites, barium ferrites, metallic composite ferrites (preferably selected from zinc, nickel and mixtures thereof), and mixtures thereof; (ii) ferromagnetic metals selected from iron, cobalt, rare earth metals and mixtures thereof; and (iii) ferromagnetic particles resulting from the decomposition of organo-metallic compounds, such as iron nitrides, iron carbonyls, cobalt monoxides, and iron monoxides. Methods for producing ferromagnetic particles from the decomposition of organo-metallic compounds can use one or more methods known in the art, including those presented in Wonterghem et al., *Phys. Rev. Lett.* 55:410-13 (1986); Chantrell et al., *J. Magn. Magn. Mat.* 15-18:1123-4 (1980); Kilner et al., *IEEE Trans. Mag.* MAG-20:1735-7 (1984); Hoon et al., *J. Magn. Magn. Mat.* 39:107-10 (1983); Nakatani et al., *J. Magn. Magn. Mat.* 85:11-13 (1990); Nakatani et al., *J. Magn. Magn. Mat.* 122:10-14 (1993); Lambrick et al., *J. Magn. Magn. Mat.* 65:257-60 (1987); and Lopez-Quintela et al., Spanish Patent No: 9,201, 984, which are incorporated herein in their entirety. In another embodiment, one or more magnetic-fluids 40 disclosed herein are comprised of ferric or ceramic based particles. A ferrite or ceramic is a ceramic iron oxide compound having ferromagnetic properties with a general formula $MFe_2O_4$ where M is generally a metal such as cobalt, nickel or zinc (Chambers Science and Technology Dictionary, W. R. Chambers Ltd. and Cambridge University Press, England, 1988). The phenomenon of ferrimagnetism is observed in ferrites and similar materials.

In a particular embodiment, the disclosure provides for one or more magnetic-fluids 40 that are colloidal suspension comprising magnetic materials or particles suspended in one or more carrier fluids. Carrier fluids include aqueous-based solvent(s), organic-based solvent(s), or combinations thereof, including, but not limited to, synthetic oils, mineral oils, vegetable oils, silicon containing solutions, perfluoropolyether, hexadecane, kerosene, and water. Choice of the carrier fluid depends in large part on the type, amount, and characteristics of the magnetic materials to be suspended in the carrier fluid. Generally, the choice of the carrier fluid should be chosen so that (a) magnetic materials which can be evenly disperse in the carrier fluid by Brownian motion; (b) have a certain level of viscosity so that the magnetic materials remain suspended in carrier fluid even when exposed or not exposed to a magnetic field and (c) have a controlled surface tension between carrier fluid and magnetic particle such that the interactions between particles can be adjusted, resulting in a fine-resolution features in the template. Moreover, the viscosity and the surface tension of the carrier fluid can also influence the resulting features of the magnetic-fluid template. For example, use of a carrier fluid with a lower viscosity generally results in the magnetic-fluid template having sharper and more defined features with a given type of magnetic material, while use of the same magnetic material with a carrier fluid having a higher viscosity generally results in the magnetic-fluid template having more rounded and muted features. Accordingly, the magnetic-fluid template feature size and sharpness can be controlled by modifying the viscosity or surface tension of the one or more carrier fluids and/or the amount of magnetic materials or particles (as well as the magnetic particle's surface functionality via surfactant adsorption) suspended in the carrier fluid. In a particular embodiment, the viscosities of the magnet-fluids 40 disclosed herein, will have dynamic viscosities in the range of pascal-second (Pa·s) of 0.001 to 20; 0.01 to 20; 0.1 to 20; 0.001 to 10; 0.001 to 5; 0.001 to 1; 0.001 to 0.1; or 0.001 to 0.01. In a further embodiment, one or more magnetic-fluids 40 described herein are comprised of at least 70%, 75%, 80%, 85%, 86%, 87%, 88%, 89%, 90%, 91%, 92%, 93%, 94% or 95% by volume of one or more carrier fluids.

In another embodiment, a magnetic-fluid 40 may comprise a certain volume concentration or molar amount of magnetic materials or particles. Generally, by increasing the volume concentration of the magnetic materials or particles in a magnetic-fluid 40 results in (a) the magnetic-fluid becoming more viscous; and (b) the magnetization of the fluid scaling linearly until a saturation concentration is reached. Accordingly, the magnetic-fluid template features can be controlled by increasing or decreasing the volume concentration of magnetic materials in a magnetic-fluid 40 disclosed herein. The disclosure therefore provides for one or more magnetic-fluids 40 described herein comprising magnetic materials of varying volume concentrations. In a particular embodiment, one or more magnetic-fluids 40 described herein are comprised of at least 0.1%, 1%, 2%, 3%, 4%, 5%, 6%, 7%, 8%, 9%, 10%, 11%, 12%, 13%, 14%, 15%, 20%, or 30% by volume of magnetic materials. In another embodiment, one or more magnetic-fluids described herein are comprised of no greater than 1%, 2%, 3%, 4%, 5%, 6%, 7%, 8%, 9%, 10%, 11%, 12%, 13%, 14%, 15%, 20%, or 30% by volume of magnetic materials.

In another embodiment, the disclosure provides for magnet-fluids 40 that further comprise one or more surfactants or dispersing agents. Surfactants or dispersing agents prevent the magnetic materials or particles from clumping together, ensuring that the magnetic materials do not form aggregates that become too dense to be held in suspension by Brownian motion. A surfactant as used herein has a polar head and non-polar tail (or vice versa), one of which adsorbs to the magnetic material, while the non-polar tail (or polar head) sticks out into the carrier fluid, forming an inverse or regular micelle, respectively, around the magnetic material. Steric repulsion then prevents agglomeration of the magnetic materials.

While the surfactants or dispersing agents of the disclosure are useful for prolonging the settling rate of the magnet-fluids 40 disclosed herein, they may also affect the magnetic-fluid's 40 properties (specifically, the magnetic-fluid's magnetic saturation). The addition of surfactants (or any other foreign particles) decreases the packing density of the magnetic materials when in their activated state (under a magnetic field), thus decreasing the fluid's on-state viscosity, resulting in a "softer" activated fluid. The on-state viscosity (the "hardness" of the activated fluid) can therefore be modified so as to affect settling rate of a magnetic-fluid 40 so that the magnetic-fluid template features can be either be sharpened or muted. Examples of surfactants or dispersing agents that can used with the magnet-fluids 40 disclosed herein include, but are not limited to, oleic acid, tetramethylammonium hydroxide, glycerin, citric acid, phosphoric acid ester of an ethyoxylated alcohol, and soy lecithin. In a particular embodiment, one or more magnetic-fluids 40 described herein are comprised of at least 0.1%, 1%, 5%, 7%, 9%, 10%, 11%, 12%, 13%, 14%, 15%, 16%, 17%, 18%, 19%, 20%, 25%, 30%, or 40% by volume of one or more surfactants. In another embodiment, one or more magnetic-fluids 40 described herein are comprised of no greater than 1%, 5%, 7%, 9%, 10%, 11%, 12%, 13%, 14%, 15%, 16%, 17%, 18%, 19%, 20%, 25%, 30%, or 40% by volume of one or more surfactants.

In a particular embodiment, a magnetic-fluid 40 disclosed herein will be able to reversibly change from a linear viscous fluid with free flow to a semi-solid material with controllable yield stress when placed under a magnetic field. In a further embodiment, when a magnetic field is applied, dispersed magnetic materials of a magnetic-fluid 40 disclosed herein will form chains that are orientated parallel to the applied magnetic field, increasing the yield stress of the magnetic-fluid 40. In effect, a magnetic-fluid 40 disclosed herein can function as a magnetorhelogical fluid ("MRF"). The ability of a magnetic-fluid 40 disclosed herein to form semi-solid to liquid-based features when a magnetic field is applied, can largely be controlled by choice of magnetic particle size. Typically, to form more solid-like features when a magnetic field is applied, the magnetic-fluid 40 disclosed herein will contain micron sized magnetic particles. The larger the particle size the greater the yield stress. Methods to control the magnetic particle size for generating magnetic-fluids 40 with varying fluid properties, include sieving-based methodologies known in the art, such as those presented in S. W. Charles, The Preparation of Magnetic Fluids, Stefan Odenbach (Ed.): LNP 594:2-13 (2002); Chiriac et al. *IEEE Transactions on Magnetics* 45(1):4049-4051 (2009), and Lpez-Lpez et al., *J. Phys. Conf. Ser.* 149:012073 (2009), which are incorporated herein in their entirety. Synthesis of magnetic-fluids 40 comprising angstrom sized magnetic materials can also be obtained by using method commonly known in the art, such as the methods presented in Bee et al., *Journal of Magnetism and Magnetic Materials,* 149(1-2): 6-9 (1995), which is incorporate herein in its entirety.

The magnetic-fluids 40 disclosed herein can be made de novo by methods known in the art, such as those presented in Wilson et al., *European Cells and Materials* 3(*Suppl.* 2):206-229 (2002), which is incorporate herein. Alternatively, magnetic-fluids 40 disclosed herein can be purchased premade from various vendors, including, but not limited to, FerroLabs® (Sterling, Va. 20165, USA), Dynal (Oslo, Norway), Apex Magnets (Petersburg, W. Va. 26847, USA).

Figure 3:
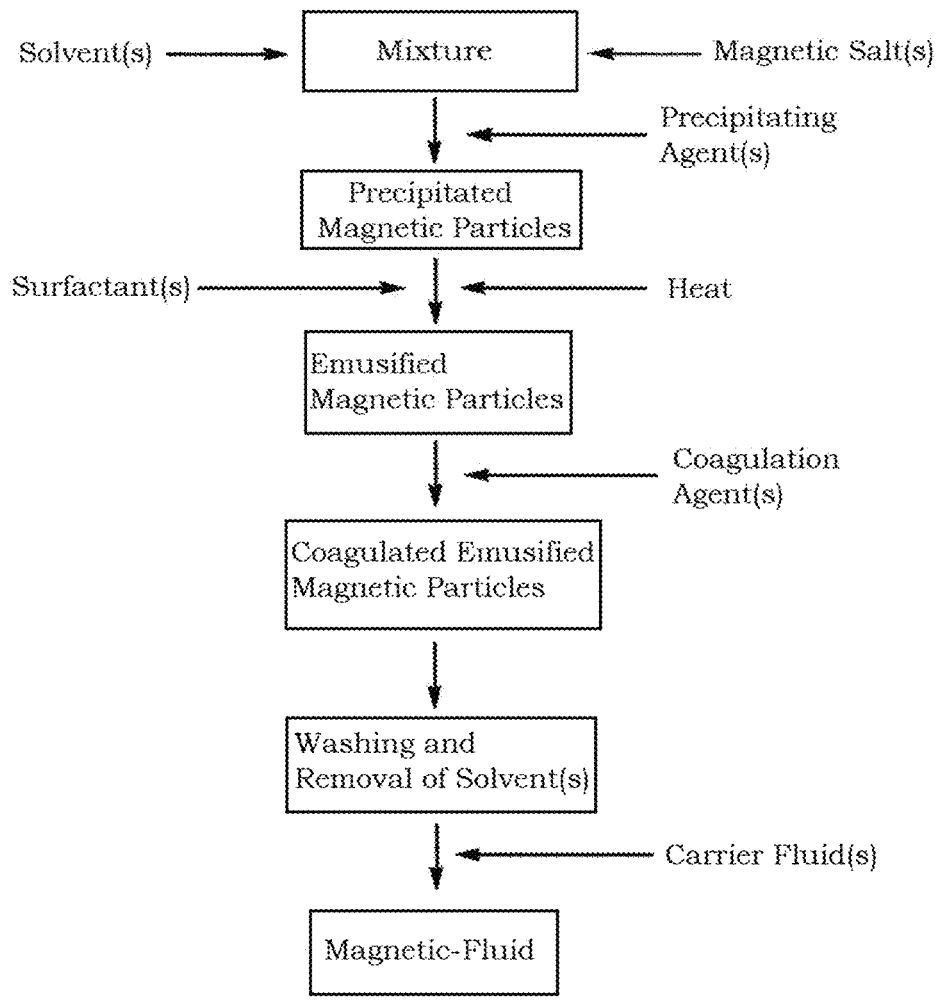
FIG. 3 illustrates a generalized method of the disclosure to produce a magnetic-fluid.

In a particular embodiment, the disclosure provides a generalized scheme using surfactants to stabilize colloidal magnetic materials to produce a magnetic fluid 40 of the disclosure (e.g., see FIG. 3). It should be understood that the schemes provided herein are provided as a generalized outlines to make a magnetic fluids 40 of the disclosure and it would be expected that obvious modifications may be made to the schemes by a person of skill in the art in order to make magnetic fluids having similar but different characteristics. As provided in FIG. 3, metal salts, such as $Fe^{2+}$ and $Fe^{3+}$, are first dissolved in an aqueous based solvent system. To which is added a precipitating agent, such as ammonium hydroxide, to form a precipitant of magnetic particles. After which, a surfactant or dispersing agent is added at an elevated temperature in the presence of a base to emulsify the magnetic particles. The emulsified magnetic particles are then coagulated by adding a coagulation agent, such as dilute nitric acid. Any unreacted and non-coagulated ions are removed by using dialysis in water, and particulate contaminants are removed by centrifugation. One or more carrier fluids can then be added to make a magnetic-fluid 40 of the disclosure.

Referring again to FIG. 1, a process and system of the disclosure is generally presented. The process of the disclosure comprises providing a magnetic-fluid 40 (e.g., a ferromagnetic fluid) and exposing the magnetic fluid to a magnetic field generated by a magnetic field generator 10. The magnetic field can be used to generate a desired pattern 60 in the magnetic-fluid 40. The pattern can comprise ridges, peaks, valleys and the like. The selection of the strength of the field, magnetic fluid composition, patterning of the magnetic field, container bottom surface, and spacer design can all play a role, individually or together, in obtaining a desired pattern. Once the pattern is generated a casting medium 50 is added to obtain an impression of the pattern. Alternatively, the magnetic fluid 40 may comprise a casting material that can be polymerized to "fix" the pattern. In some embodiments, the casting medium 50 is a polymer or hydrogel. The casting material can be polymerized by exposure to a chemical, heat or light using materials known in the art. The resulting cast or multi-structured material 60 obtained may be used directly in various products or processes. In a particular embodiment, the cast or multi-structured material 60 can be used as a mold for an additional material.

Figure 2:
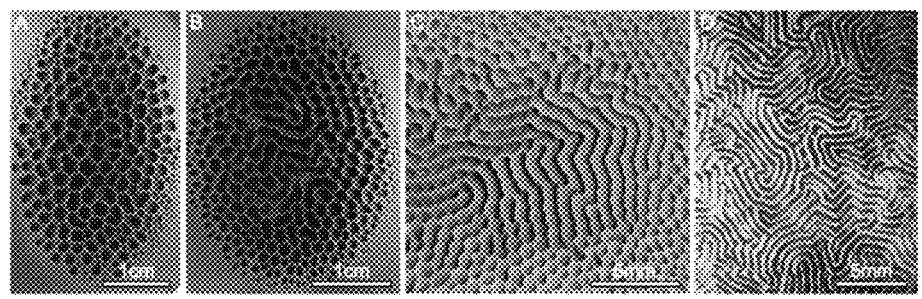
FIG. 2A-D shows micrographs of structural diversity of the final product obtained using methods of the disclosure.

By adjusting the casting parameters, it is possible to predictably transition from a honeycomb (A) to a labyrinthine (B) morphology (e.g., see FIG. 2). While this honeycomb to labyrinth transition is only one of the many possible sets of geometries using this approach (which additionally include spikes, ridges, and concentric rings), the example illustrates the subtleties of form that can be generated. Magnetic field strength can be used to control feature size (e.g., see FIG. 2 at panels (C) and (D)), which can yield mechanically robust labyrinth walls. Feature size can be achieved through lowering of the interfacial tension between magnetic fluid 40 and the casting medium 50 through modification of these components.

Since the process and system of the disclosure can be modified in almost an infinite number of ways (mold material, secondary casting material, etc.) the process is infinitely customizable to achieve any desirable result. In addition, the source, strength, orientation, and shape of the magnetic field can also be varied through the use of permanent magnets, electromagnets, solenoids, magnetic arrays, flattened solenoids, alternating currents, and the like. The composition of magnet fluid 40 can also be modified to affect the interfacial tension between the magnetic fluid 40 and the casting medium 50 though changes in concentration of the magnetic material, size of the magnetic materials, choice of surfactant(s), and choice of carrier fluid(s).

For example, using the process and system described herein, multi-structured materials displaying structural ordering that can be controlled through a wide range of pattern 60 sizes and shapes can be obtained. The process comprises casting a liquid based casting medium 50, which solidifies (such as a resin or molten metal) over the surface of a magnetic-fluid 40 disclosed herein (e.g., a paramagnetic liquid comprising surfactant coated iron oxide nanoparticles suspended in an organic solvent). By exposing the liquids to a magnetic field generated by a magnetic field generator 10, the magnetic fluid 40/casting medium 50 interface may be altered in a predictable and controllable manner to imprint various high aspect ratio patterns 60 into the casting medium 50. The range of patterns 60 generated includes honeycombs, labyrinths, spikes, ridges, and concentric rings. The advantage of this synthesis method is the variability of control, low cost, scalability, and ease of production in comparison to other methods capable of producing similar results. The casted or multi-structured materials can be used "as is" or can be used as molds for the casting of other materials.

A casting medium 50, such as a curable fluid or molten metal, can be poured onto a pattern 60 generated using a magnetic fluid 40 that is under a magnetic field generated by a magnetic field generator 10. Parameters such as how the magnetic field strength is generated, the strength of the magnetic field, amount of magnetic fluid, viscosity of the magnetic fluid, and/or amount of casting material can all be tailored so as to pattern the desired casted or multi-structured material. In an alternate embodiment, a magnetic-fluid 40 may further comprise an immiscible casting medium 50 of lower density that can be polymerized or fixed after a magnetic field is applied so as to form a multi-structured material. A curing agent (heat, catalyst, light) can be applied to cross-link the casting medium 50 to "lock in" the multi-structured material. After curing, the magnetic fluid 40 can then be released with removal of the magnetic field and the surrounding container.

A secondary phase can then be added to fill in the void space of the casted or multi-structured material created by the removal of the magnetic fluid. The secondary phase can include a myriad of materials (e.g., structural ceramics) via multiple methods (e.g., slurry infiltration, dip-coating, cvd, sputtering, and the like) to create a composite structure with desired features. In addition, the material properties of the casting medium 50 can be adjusted so as to have a desired property (e.g., creating a softer organic casted or multi-structured material). Provided herein, is an a specific example demonstrating a proof of principle (the labyrinthine pattern shown in FIG. 2D). A ferrofluid (1 mL) was placed in a hexagonal weigh boat (1" interior side length). A ½" acrylic spacer was placed under the weigh boat. The ferrofluid was then exposed to a magnetic field created by placing a 2"×1"×¼" thick Grade N42—Nickel Plated Neodymium magnet under the spacer. Epofix™ epoxy (3 mL) was poured on top of the patterned ferrofluid and allowed to cure (with the magnet in place) for about 12 hours. After curing, the resin casting was removed from the weigh boat and washed with kerosene to remove any residual ferrofluid. Although epoxy was used in the examples presented herein, various alternative casting medium 50 may have also been used. Examples of such casting mediums 50 include, but are not limited to, molten metals, polysulfide rubbers, silicone rubbers, urethane rubbers, urethane plastics, urethane foams, plasters, hydrogels and silicone foams. Casting mediums 50 are readily available to one of skill in the art from various vendors, such as Sigma-Aldrich (St. Louis, Mo. 63103), and can be selected based upon creating a particular or desired casted or multi-structured material.

The usefulness of the resulting casted or multi-structured material is very broad including their use in various methods and compositions. A small sampling of such methods and compositions include rapid prototyping, creating composite structural materials, complex energy storage devices, and microfluidics. Within this set of applications, secondary phase materials which can be cast or grown into these multi-structured materials include biological (e.g., cells and tissues), organic (e.g., polymers and chemotherapeutics), and inorganic (e.g., structural ceramics, catalysts, and semiconductors) materials.

For example, in the automotive, aerospace, and watercraft industries these template materials can be used for lightweight structural materials, heat sinks for heating or cooling, or surface texturing for boundary layer reduction, cavitation induction, and subsequent drag reduction. In addition, non-slip surfaces can be created using these template materials.

For infrastructure applications, these template materials can be modeled for the design of high-strength bridges, tunnels, roads, and the like. In addition using the small channel size, these template materials could be used to wick water away from the surface of roads and other surfaces through the action of capillary forces.

For military applications, these template materials can be modeled for the design of IED resistant panels, biological and chemical weapon detection, and abrasion resistant coatings. In addition, by infilling a transparent casted material with a second material with a lower or higher modulus, one can create a new class of damage tolerant plastics for use optically transparent face shields and windows. The modulus mismatch between the two interpenetrating phases interrupts the propagation of cracks though deflection at the interfaces.

The multi-structured materials disclosed herein can also be used in 3D battery cathodes (material replacement strategy) and damage tolerant battery materials. In addition through a positive/negative reduction casting process, it is possible to create interpenetrating networks of nanotubes, nanowires, and nanorods (all of various dimensions and material composition) by controlling the regularity of the generated structure.

Additionally, by controlling the periodicity of the pores of the template materials disclosed herein, one can construct photonic crystal at multiple wavelengths including, but not limited to, visible and ultraviolet radiation.

Further, by controlling the morphology and dimensions of the casted material, one can create periodic crystalline scaffolds for quantum dots and dyes for use in sensitized solar cells. The casted materials can also be used as templates for the controlled growth of nano- and micro-wires.

The multi-structured materials disclosed herein can further be used as noise cancelling materials by controlling the side length to match the frequency of interest.

The high surface area design makes the multi-structured materials of the disclosure ideally suited for use as catalyst supports, structural ceramics and semiconductors for sensor applications.

Further, the high surface area of the multi-structured materials disclosed herein also makes them well suited for bone, cell, and tissue scaffolds. The casted materials are ideally suited for being impregnated with chemotherapeutic agents for the controlled release of drugs.

A number of embodiments of the invention have been described. Nevertheless, it will be understood that various modifications may be made without departing from the spirit and scope of the invention. Accordingly, other embodiments are within the scope of the following claims.

What is claimed is:

1. A process for producing a multi-structured material, comprising the steps of:
   (a) providing a ferrofluid;
   (b) exposing the ferrofluid to a magnetic field to obtain a ferrofluid template;
   (c) providing a casting medium; and
   (d) generating a cast of the ferrofluid template comprising covering the ferrofluid template with the casting medium so as to produce a multi-structured material.

2. The process of claim 1, wherein the ferrofluid comprises a plurality of magnetic particles dispersed in one or more carrier fluids containing one or more surfactants.

3. The process of claim 1, wherein the ferrofluid comprises magnetic materials selected from the group consisting of ferromagnetic oxides; manganese ferrites; cobalt ferrites; barium ferrites; metallic composite ferrites comprising zinc, nickel and mixtures thereof; iron; cobalt; rare earth metals; and mixtures of any of the foregoing.

4. The process of claim 1, wherein the ferrofluid comprises nanometer sized magnetic particles.

5. The process of claim 1, wherein the ferrofluid is a magnetorheological fluid comprising micron sized magnetic particles.

6. The process of claim 1, wherein the magnetic field is generated using a single or an array of magnetic devices and/or magnetic materials.

7. The process of claim 6, wherein the magnetic material is a permanent magnet.

8. The process of claim 7, wherein the permanent magnet is an alloy of neodymium/iron/boron, Samarium cobalt, AlNiCo, or ferrite.

9. The process of claim 6, wherein the magnetic device is either an electromagnet or flattened solenoid where a current to the electromagnet or flattened solenoid is adjustably controlled by entering commands into an attached computer.

10. The process of claim 1, wherein the casting medium is selected from the group consisting of epoxy, molten metal, hydrogel, resin, polysulfide rubber, silicone rubber, urethane rubber, urethane plastic, urethane foam, plaster, and silicone foam.

11. The process of claim 1, wherein the casting medium comprises monomers that is polymerized to a polymer.

12. The process of claim 11, wherein the cast is generated by polymerizing the monomers by using a curing agent.

13. The process of claim 12, wherein the curing agent is activated by light, heat or a chemical catalyst.

14. The process of claim 1, further comprising removing the multi-structured material from the ferrofluid.

15. The process of claim 1, further comprising using the multi-structured material as a mold.

16. The process of claim 1, wherein the multi-structured material is biocompatible.

17. The process of claim 1, wherein the multi-structured material is conductive.

18. The process of claim 1, wherein the multi-structured material is used as a microfluidic device.

19. The process of claim 1, wherein the multi-structured material comprises an energy storage device.

* * * * *